United States Patent [19]
Bushell

[11] Patent Number: 6,102,017
[45] Date of Patent: Aug. 15, 2000

[54] AUTOMATIC VALVE FOR THE INLET MANIFOLD OF AN INTERNAL COMBUSTION ENGINE

[76] Inventor: Richard Nigel Bushell, Bumble Cottage, 107 Offington Lane, Offington, Worthington, West Sussex, BN14 9RW, United Kingdom

[21] Appl. No.: 08/945,451

[22] PCT Filed: Apr. 25, 1996

[86] PCT No.: PCT/GB96/00999

§ 371 Date: Oct. 24, 1997

§ 102(e) Date: Oct. 24, 1997

[87] PCT Pub. No.: WO96/34194

PCT Pub. Date: Oct. 31, 1996

[30] Foreign Application Priority Data

Apr. 27, 1995 [GB] United Kingdom .................. 9508519
Oct. 20, 1995 [GB] United Kingdom .................. 9521576

[51] Int. Cl.[7] ................................................. F02M 23/00
[52] U.S. Cl. ........................................ 123/587; 137/480
[58] Field of Search ........................... 123/587; 137/480, 137/540, 543, 17

[56] References Cited

U.S. PATENT DOCUMENTS

| | | | |
|---|---|---|---|
| 1,547,278 | 7/1925 | Whytehead | 123/587 |
| 1,564,076 | 12/1925 | Lare | 123/587 |
| 1,689,280 | 10/1928 | Fansler | 137/480 |
| 2,326,598 | 8/1943 | Acosta | 123/587 |
| 3,463,132 | 8/1969 | Krieck | 123/587 |
| 4,026,257 | 5/1977 | Madden et al. | 123/587 |

FOREIGN PATENT DOCUMENTS

| | | |
|---|---|---|
| 0023837 | 2/1981 | European Pat. Off. . |
| 2084305 | 12/1971 | France . |
| 234162 | 11/1994 | Taiwan . |
| 250160 | 6/1995 | Taiwan . |
| 2243431 | 10/1991 | United Kingdom . |

*Primary Examiner*—Noah P. Kamen
*Attorney, Agent, or Firm*—Lahive & Cockfield, LLP

[57] ABSTRACT

An automatic bleed valve is disclosed, suitable for attachment to the inlet manifold of an internal combustion engine in order to provide an effective embodiment of the "air bleed" principle. Small amounts of inlet air are allowed into the inlet manifold at periods of high vacuum (low pressure) present during deceleration. The valve closure (38) is biassed by a biassing means (36), e.g. a compressing spring, which acts on the face of the closure disposed away from the seat (22). Other aspects provide for a valve seat which is adjustable in position relative to the closure, a closure and seat of different plastics materials, and a closure with a conical aspect, preferably paired with a seat with a complementary contact portion.

7 Claims, 3 Drawing Sheets

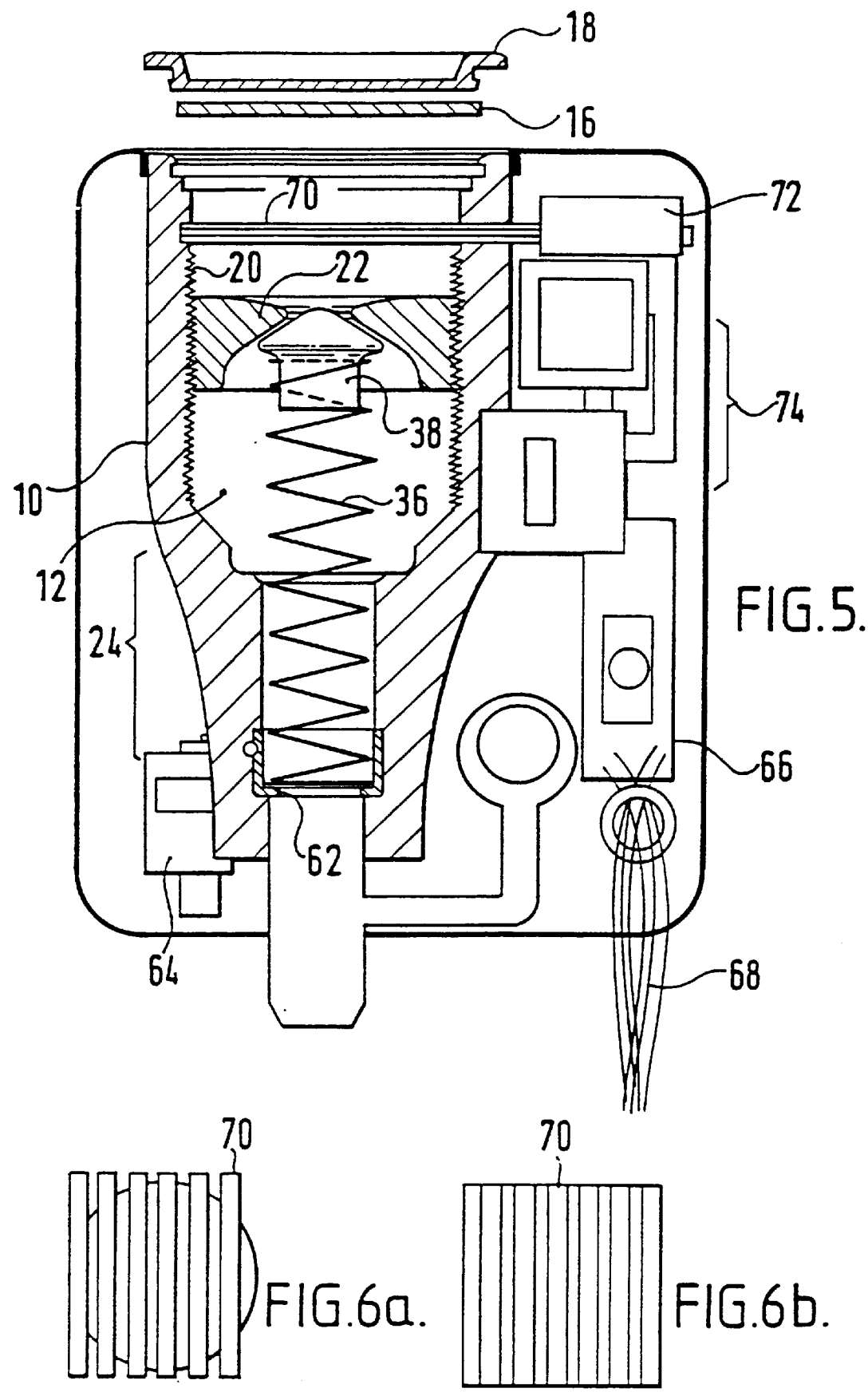
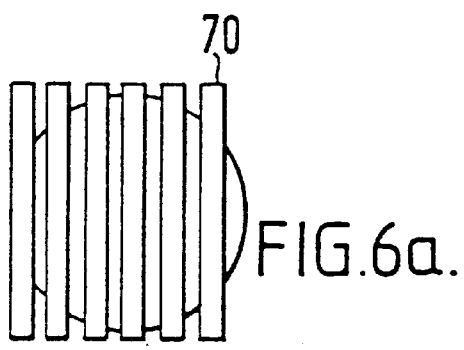
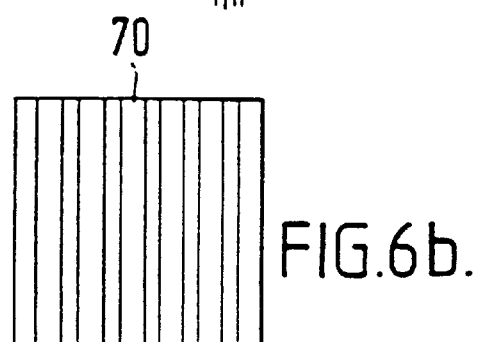

AUTOMATIC VALVE FOR THE INLET MANIFOLD OF AN INTERNAL COMBUSTION ENGINE

BACKGROUND OF THE INVENTION

The present invention relates to an automatic bleed valve. It is especially suitable for attachment to the inlet manifold of an internal combustion engine.

The principle of "air bleed" has been known for many years. This principle states that allowing a small amount of additional air into the inlet manifold of an internal combustion engine at times of particularly low pressure (high vacuum), for example during moments of acceleration or deceleration of the engine, will allow significantly more efficient fuel burning within the engine. This should, in theory, reduce the emission of pollutants such as carbon monoxide (CO) and unburnt hydrocarbons (HC). However, to the knowledge of the inventor, no commercially useful embodiment of this principle has been produced. This is essentially because the reaction time of a bleed air supply must be extremely small in order to keep up with the variations in vacuum in the inlet manifold. As an example, the period for which air must be supplied is of the order of tens of milliseconds.

Early examples of this principle can be found in GB496409 from 1937 and GB690635 from 1950. Such devices do not appear to have become common in the field.

GB 2129869 and GB 2213875 propose arrangements in which a ball bearing-based non-return valve is arranged to supply bleed air to the inlet manifold. The ball bearing is biased towards a valve seat by a spring. However, the response time of these versions are lower than desirable, and in addition the. CO and HC reductions achieved are disappointing, even taking into account the lower response time.

In recent times, attention has been directed to computer based engine management systems (EMS). These are essentially microprocessors supplied with data from a number of sensors distributed around the engine. The EMS notes this data and compares it with preset data and/or algorithms and actively manages certain variables in order to optimise the fuel burning characteristics. However, such a system will inevitably be reactive in that an imbalance must first be detected and then corrected after it has existed for a certain period. Thus, the efficiency of such systems is inherently limited by their processing times.

Recent attention has therefore been directed to providing ever better response times for an existing EMS.

SUMMARY OF THE INVENTION

The present invention provides a working, useful embodiment of the air bleed principle. To do so, it proposes a number of departures from the existing arrangements.

The present invention therefore provides, in its first aspect, an air inlet valve for the inlet manifold of an internal combustion engine, comprising a valve seat and a valve closure, the seat and the closure having complementary-formed conical mating surfaces, the closure being biassed toward the seat by a biassing means acting on the face of the closure disposed away from the seat.

It is preferred if, in this arrangement, the biassing spring is disposed in the lee of the valve closure thereby to limit disturbance of airflow over the closure.

A suitable biassing means is a compression spring. In that case, it is preferred if the compression spring alone supports the valve closure. This can facilitate placing the spring in the lee of the closure, and generally reduces the number of parts within the potential airflow path of the valve.

In its second aspect, the present invention provides an air inlet bleed valve for the inlet manifold of an internal combustion engine, comprising a valve seat member and a valve closure element biased towards the valve seat member, the seat member and closure element being enclosed within a housing, wherein the valve seat member is locatable within that housing in any one of a plurality of positions displaced longitudinally with respect Lo the biassing of the valve closure element.

Thus, the strength of biasing of the valve closure can be varied, together with the internal volume behind the valve arrangement. This allows the arrangement to be tuned to a particular engine. Whilst the ideal air fuel ratio is 14.7 to 1, an individual engine may be set to run at anywhere between 10 to 1 and 12 to 1, to provide for smooth and robust running. The exact ratio for which a particular engine is set will generally differ from the next engine in line. Thus, the exact pressure in the inlet manifold which corresponds to normal running, sharp acceleration, and sharp deceleration will vary from engine to engine. By this aspect of the present invention, the inlet valve can thus be tuned to reflect this.

Preferably, the valve seat is moveable longitudinally by rotation of a screw thread arrangement. Ideally, the screw threads will be external of the seat and internal within a cylindrical bore in the housing. Suitably, the seat can be disc-shaped. Thus, the adjustment screw can be securely enclosed within the housing. This prevents tampering and enables the vendor of the article to provide a guarantee. Preferably, the housing is sealed against tampering, for example by use of a snap ring retainer for a porous lid. Snap rings are known per, se and cannot be removed without damage to and hence sacrifice of the ring.

A fine pitched screw thread is preferred, to allow more precise adjustment. A preferred maximum pitch is 30 μm.

These aspects allow embodiments of the present invention to achieve reductions in CO and HC pollutants that are closer to those predicted from the theoretical application of the air bleed principle, and significantly better than the ball bearing design.

The present invention also, independently, provides a tool suitable for adjustment of such a preferred valve seat.

This tool, which is according to the third aspect of the present invention, comprises an elongate engagement portion extending from a handle, a tip of the engaging portion having means for inter-engagement with the valve seat, and a longitudinal flow passage running internally of the engagement portion from the tip thereof to an outlet displaced from the tip of the elongate portion. Thus, the tool can be used to engage and rotate the valve seat whilst still allowing passage of air through the valve, via the flow passage. Preferably, the passage is narrower in cross-section than the aperture of the valve seat, to provide a venturi acceleration of the air passing therethrough. This should give an audible effect when air is passing which will be detectable by an engineer tuning the device, to aid such tuning. Alternatively, or in addition, the outlet of the internal passage can be located in the vicinity of the handle, so at to allow a thumb or other digit to be placed near the outlet to sense air flow directly.

In a particularly preferred version, the tip of the elongate portion includes a sealing means for sealing against the valve seat.

The engagement means can be a simple projection or pair of projections on the tip of the elongate portion which engage in corresponding recess(es) on a face of the valve seat, or vice versa.

In its fourth independent aspect, the present invention provides an air inlet bleed valve for the inlet manifold of an internal combustion engine, comprising a valve seat and a valve closure element biased toward the valve seat and a flow passage leading from the valve seat to a connection port for communication with the inlet manifold, wherein the cross-sectional area of the flow passage at a point intermediate the connection port and valve seat is less than the cross-sectional area of the flow passage at points both upstream and downstream of that intermediate point.

Thus, the flow passage provides a form of "venturi". It has been found by the inventor that such an arrangement surprisingly provides a much quicker transmission of the inlet manifold pressure to the valve seat and closure. Thus, the bleed valve will react very much more quickly than otherwise.

In its fifth independent aspect, the present invention relates to an air inlet bleed valve for the inlet manifold of an internal combustion engine, comprising a valve seat and a valve closure element biased toward the valve seat, wherein the valve closure is conical in external section, the inclusive angle of the cone being between 55 and 125°, preferably 75 to 105°, more preferably 85 to 95°, and wherein the seat is correspondingly formed to provide a measure of sealing against the closure element.

Such an inclusive angle has been found to enable swift response of the valve closure element in terms of the translational distance required to open the valve to a sufficient extent, whilst being sufficiently narrow to minimise the disturbance to air flow across the closure element.

More preferably, the valve closure element is free floating with respect to the valve seat. One way of achieving this to support the valve closure element via the biasing means only.

By these preferred arrangements, the valve closure element becomes self centering. This notably improves the sealing when closed, which is of great benefit in this context. Failure to close promptly and properly may cause an increase in fuel consumption, in certain circumstances.

In its sixth independent aspect, the present invention provides an air inlet bleed valve for the inlet manifold of an internal combustion engine, comprising a valve seat and a valve closure element biased toward a valve seat, wherein the closure and seat are of a different plastics material. Plastics material is advantageous in this circumstance because the resultant lower weight of the closure element reduces the inertia of that element and thereby increases the reaction speed. A suitable plastics material for one of the element is nylon 66, and it is particularly preferred if the seat is formed of this material. However, the use of identical plastics materials for both the seat and closure has been found to result in unacceptably high rates of wear.

A particularly suitable material for the closure element is a PTFE/acetal mixture. The PTFE component is preferably between 90 and 98%, balance acetal. A particularly preferred composition is about 96% PTFE and about 4% acetal. This material is preferred because the PTFE gives an especially low friction surface which increases the reaction speed, whilst the acetal ensures that the element has a sufficient strength.

Such a low friction surface for the valve gives surprisingly better response times. It is thought that this is because it reduces the tendency of the valve closure to "stick" temporarily whilst travelling to the closed position. In extreme circumstances, it is possible for the valve closure to sit in an open position, held in place by friction alone. Such a situation can lead to increased fuel consumption.

A preferred opening pressure for the valve of all the above aspects is 14 inches of Mercury. Clearly, many of the valves encompassed by the above aspects will be adjustable in respect of the pressure at which they open, in which case it is preferred that they are capable of adjustment so as to open at that pressure.

In the case of relatively large engines, it has been found by the inventor that further improvements in emissions reduction can be obtained by providing two such valves in parallel, with one valve opening at a higher pressure than the other. This means that at very high vacuum levels, larger volumes of air can be supplied correspondent with the higher demands of a larger engine. Suitable pressures are between 13 and 17 inches for one valve and upwards of 16 inches for the second, subject to it being greater than that for the first valve.

The present invention also relates to an internal combustion engine comprising an air inlet bleed valve communicating with the volume enclosed by the inlet manifold, wherein the air inlet bleed valve is in accordance with at least one of the above aspects. It also relates to a vehicle incorporating such an internal combustion engine.

BRIEF DESCRIPTION OF THE DRAWING

Embodiments of the present invention will now be described by way of example, with reference to the accompanying Figures in which:

FIG. 5 is a partially exploded cross-sectional view of a further embodiment of the present invention; and FIGS. 6a and 6b are plan views of the shutter of FIG. 5 in the open and closed positions respectively.

DESCRIPTION OF ILLUSTRATED EMBODIMENT

Figure 1:
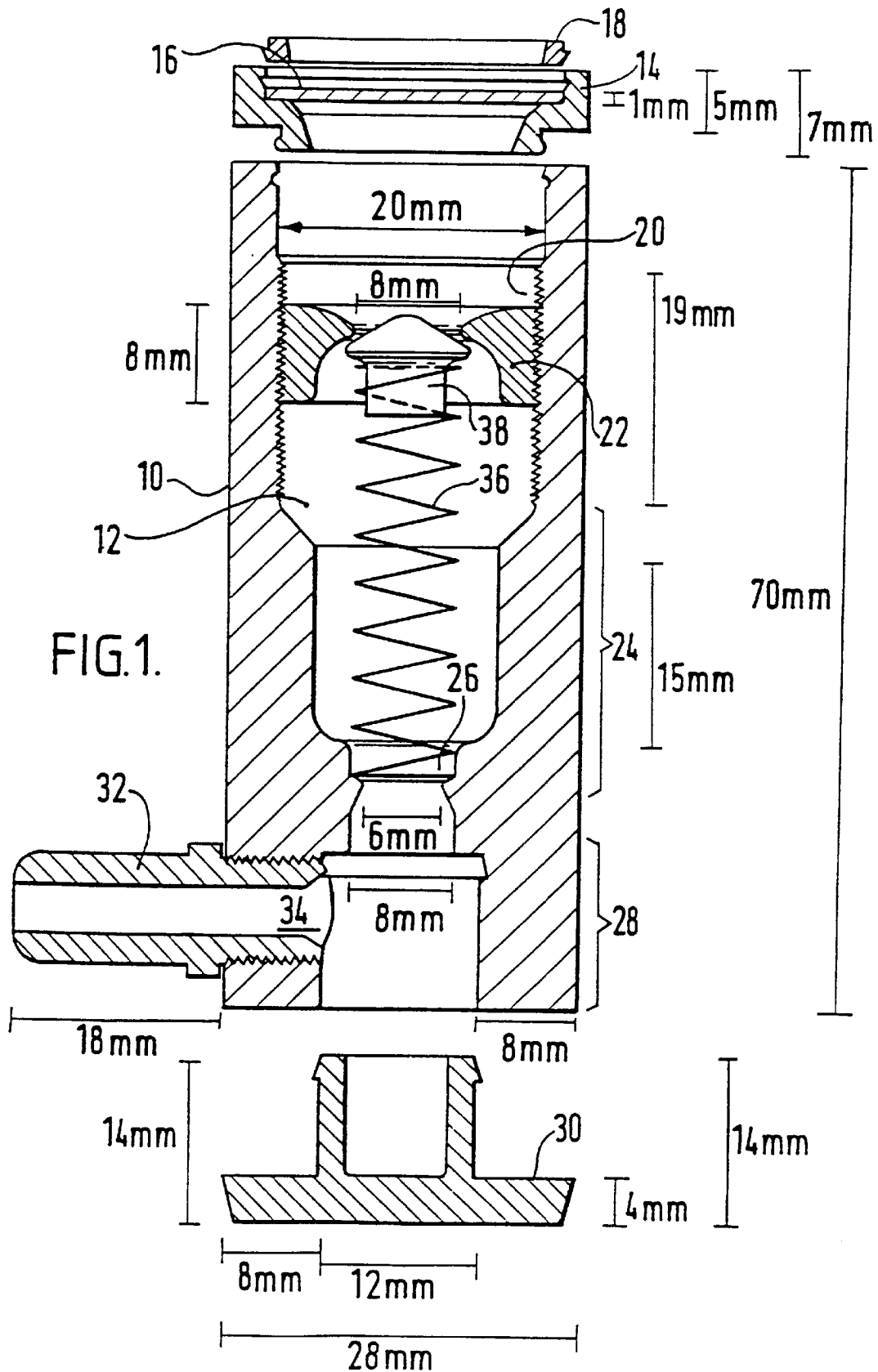
FIG. 1 is partially exploded cross-sectional view of an embodiment of the present invention.

Referring to FIG. 1, this shows a bleed valve according to the present invention, along with dimensional information for the relevant parts illustrated. It can be seen that the valve comprises a generally cylindrical body portion 10 which has an internal passage 12 extending along the length of the body portion 10. Within the passage 12 are, in sequence, a filter housing 14 at the open end of the passage 12 which holds a filter 16 by sandwiching it between a ledge on filter housing 14 and a retaining circlip 18, an internally threaded portion 20 within which is held a valve seat 22, a progressively narrowing region 24 culminating in an internal ledge 26, and a progressively widening portion 28 in the outlet of which is inserted a closure element 30 which seals the passage 12. A communication tube 32 is engaged within a tapped bore 34 leading to the passage 12. Thus, the tube 32 provides an outlet within the passage 12.

The valve seat 22 has an external screw-thread which engages with the threaded portion 20 of the passage 12. The threaded portion 20 is greater in longitudinal extent than the height of the valve seat 22, and therefore rotation of that valve seat 22 within the screw-thread will cause the longitudinal position of the valve seat 22 to alter. The pitch of the screw thread is 13/16 thousandths of an inch, or 20 μm.

Figure 2:
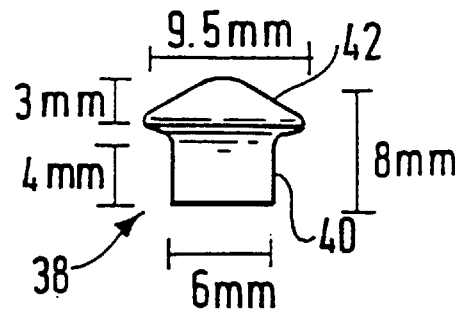
FIG. 2 is a detailed view of the valve closure element of FIG. 1.

A spring 36 lies within the passage 12 and rests at one end on the ledge 26, where it is held in a tight fit within the progressively narrowing portion 24. The spring 36 is 12 mm long. At its other end, the spring supports a valve closure element 38, shown in more detail in FIG. 2. This has a cylindrical portion 40 which is a snug fit inside the spring 36, and a cone-shaped portion 42 which fits within the aperture of the valve seat 22. In the embodiment shown, the base of the cone 42 is wider than the cylindrical portion 40, but this is not essential. It would however be necessary to provide a simple lip onto which the end of the spring 36 could abut to prevent the valve closure element falling into the spring. What is necessary is that the cone portion 42 is able to provide a measure of sealing against the valve seat 22.

Figures 3, 4:
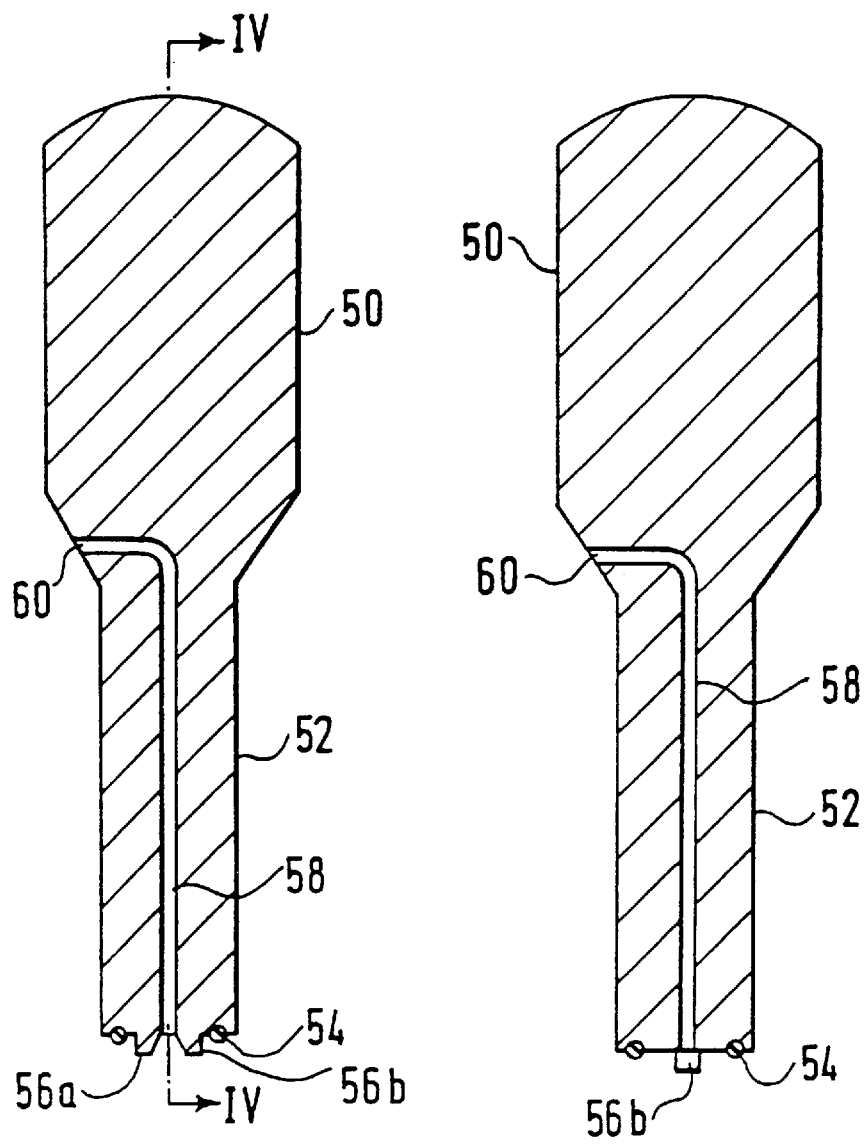
FIG. 3 is cross-sectional view of a tool according to an aspect of the present invention.
FIG. 4 is a sectional view of FIG. 3 along the lines IV—IV of FIG. 3.

On the top (outer) surface of the valve seat 22 are a pair of recesses (not shown) for engagement with the tool illustrated in FIGS. 3 and 4. The use and purpose of this will e described later.

In use, the tube 32 is connected to the inlet manifold of an internal combustion engine, and sudden increases in the vacuum (decreases in pressure) in the inlet manifold above a predetermined magnitude will be transmitted to the passage 12 and result in the bleed valve opening slightly to allow additional bleed air. It has been found by the inventor that the progressive narrowing of the passage 12 to a minimum diameter, in this example at the ledge 26, provides a venturi effect which speeds the reaction time of the device. The exact mechanism for this is not yet known, but it is believed to lie in the creation of a form of vortex within the flow passages.

The exact pressure at which an individual engine will benefit from bleed air will vary according to the engine, and is generally not precisely predictable. However, this embodiment can be tuned to a particular engine by rotating the valve seat 22 and thereby displacing it upwards or downwards as illustrated. This will both vary the volume within the passage 12 behind the valve, and the pretensioning of the spring 36 when closed. Both of these will vary the reaction characteristics of the valve and allow it to be tuned to a particular engine. It is preferred if the valve is set to open at about 14 inches of Mercury or greater.

The valve closure element 38 has an inclusive angle (in this embodiment) of 115.4°. This is particularly suitable for a high performance engine. In a normal family car, an inclusive angle of about 90° would be more appropriate. Essentially, the precise angle is a trade-off between the distance which the valve closure element 38 must travel (and hence the reaction time) and the effect of the obstruction on the air flow rate.

The valve seating is a complementary shape to the valve closure element, slightly tapered at its outer side to aid air flow.

The filter 16 is necessary since the unit will be installed under the bonnet of a vehicle. A suitable form of filter is crushed steel wool, which is a commercially available form of filter. Sintered ceramic filters are also possible, but steel wool is preferred due to its lesser resistance to air flow.

A notable advantage of the arrangement illustrated is that the circlip 18 and filter 16 prevent unauthorised access to the internal parts of the valve. Thus, once the valve has been tuned to a particular engine (which will of course necessitate removal of the filter 16 to gain access to the valve seat 22), the unit can be sealed until its next service, allowing the imposition of a warranty.

The materials selected for the various parts are significant. The body 10, tube 32, closure element 30, and filter holder 14 and circlip 18 are all structural parts and can be made from, for example, aluminium. This however is not particularly vital so long as the parts can be manufactured to necessary tolerances. In the case of aluminium, an anodising finish is preferred for corrosion reasons.

However, the valve seat 22 and valve closure element 38 must react very quickly to changing pressures behind and be of a wear-compatible material. Thus, a low density material is preferred for the valve closure element 38 in order to reduce its weight, and this suggests plastics material. This also implies plastics material for the valve seat 22, for wear reasons, but it has been found by the inventor that the use of Nylon 66 for both materials results in a higher wear rate than preferred.

In this embodiment, therefore, the valve seat 22 is of Nylon 66, whilst the valve closure element is of a commercially available mix of 94% PTFE and 4% acetal. This combination is preferred because one material is a polar polymer, whilst the other is non-polar. Hence they are incompatible and will not fuse at the microscopic level.

As mentioned above, for large engines t can be beneficial if two such valves are connected in parallel. A suitable arrangement is for the outlet 32 of one valve to connect with the internal space 12 of the other One valve is then set to open at a higher pressure that the other, for example 13 to 17 inches of Mercury for one and 16 inches or greater (but in any case greater that the first) for the second. This the allows a greater volume flow of air at particularly high vacuum levels in order to satisfy the higher demands of a larger engine.

FIGS. 3 and 4 show two cross-sections of a tool suitable for tuning the previously described valve. The tool comprises a handle 50 from which extends an elongate portion 52 which is sufficiently narrow to extend into the interior of the passage 12 at its outer end. At the tip of the elongate portion 52 is an O-ring seal 54, and within the O-ring seal are a pair of projections 56a and 56b. Between the projections 56a and 56b is the opening of an internal flow passage 58 which communicates with opening 60 at the junction between the handle 50 and elongate portion 52. In use, the filter 16 and circlip 18 are removed, and the tool is inserted into the passage 12. The projections 56a and 56b engage in corresponding recesses on the outer surface of the valve seat 22, and the O-ring 54 seals against the valve seat 22. At this stage, the engine is running. The operator can rotate handle 50, which adjusts the vertical position of the valve seat 22 in the manner previously described. During this time, all air being taken by the valve will be drawn through the passage 58 due to the O-ring 54. Since the passage 58 is narrower than the passage 12, a "sucking" noise will be heard as the valve opens, which will aid the operator in tuning the valve. Since the outlet 60 is at the edge of the handle 50, an operator can place a finger or other digit close to or nearly over the opening 60 to provide further confirmation of air flow.

FIG. 5 shows a further embodiment of the invention. In this embodiment, many parts are common to the first embodiment, shown in FIG. 1, and like reference numerals are used to denote like parts. There are however a number of significant differences which are as follows.

The biasing spring 36 which biases the valve closure element of 38 toward the valve seat 22 is seated in a ledge 62 which is movable along the axis of the spring under control of a servo motor 64. That servo is controlled by a programmable controller 66 which is fed with engine running information, for example from an engine management system, by cables 68. Thus, the valve tension is continuously adjustable within limits and this will enable the vacuum pressure at which the valve opens to be adjusted during operation of the engine.

This enables the unit to be tuned during running of the engine to setting which correspond to the type of use. For example, different demands are placed on the engine at idle, urban and cruise conditions and the unit can react to different driving conditions detected via the data arriving in cables 68. The programmable controller 66 will contain pre-recorded settings corresponding to different conditions.

It has been found that if the spring ledge 62 is moved so as to decrease the tension in the spring 36 at a time when the valve is opened, the reduced tension combined with the established airflow through the valve can mean that the valve does not then properly close of its own accord.

Hence, in this embodiment, a shutter 70 is provided. The shutter 70 is under the control of a servo 72 which is in turn actuated by an interface unit 74. In this embodiment, the shutter 70 is a three leaf blade shutter, and is shown in its open and closed positions in FIGS. 6a and 6b respectively.

Thus, immediately before the spring ledge 62 is moved, the shutter servo 72 acts to close the shutter 70, which prevents any further airflow and causes the pressures either side of the valve to equalise and hence closes the valve. The spring seat 62 is then adjusted to the correct position by its servo 64. The shutter is then opened and operation resumes.

The shutter 70 and servo 72 are arranged such that in the event of an electrical or electronic failure within the system, the shutter 70 closes, taking the unit out of action and thus having no effect on the engine. This "fail safe" action prevents faults in the unit affecting the engine in a detrimental fashion.

With the shutter in place, it is clearly impossible to adjust the valve seat 22 using the tool shown in FIGS. 3 and 4. Thus, coarse adjustment of the valve is only possible during assembly, and leaving fine adjustment to be carried out via the servo 64. This acts as a further means to prevent tampering with the unit by the user which might invalidate a warranty.

In a preferred form of the invention, the embodiments of FIG. 1 or FIG. 5 are combined with a water injection means which acts to inject water into the fuel air mixture during periods of acceleration i.e. low vacuum. Such water injection is known to be beneficial to the engine performance during periods of acceleration, and thus a combined system will be beneficial during both acceleration and deceleration (during which the high vacuum causes the valve to open).

It will be appreciated by those skilled in the art that the above described embodiments are purely exemplary of the present invention, and that many modifications could be made whilst remaining within the scope of the present invention. For example, the closure element 30 could be formed integrally with the body portion 10, as could the outlet tube 32 or the filter holder 14. Alternatively, or in addition, a secondary filter could be added before the filter 16 to provide an element of prefiltration and alleviate clogging of the filter 16. This might be desirable in dusty countries. Equally, the precise dimensions given are illustrative only and other dimensions could be selected although the present inventor has found that those dimensions shown give good results. Tests of the device illustrated achieved an 80% CO reduction and up to 70% HC reduction.

The device can be manufactured as a discrete unit, as illustrated, which is suitable for retrofitting to existing vehicles or fitting during assembly. Equally, the device can be physically incorporated into the inlet manifold as an integral part thereof.

What is claimed is:

1. An air inlet bleed valve for the inlet manifold of an internal combustion engine, comprising a valve seat and a valve closure element biased toward the valve seat, wherein one of the closure and seat is formed of a non-polar plastics material and the other one of the closure and seat is formed of a polar plastics material.

2. An air inlet bleed valve according to claim 1, wherein one of the seat and closure are of nylon 66.

3. An air inlet bleed valve according to claim 2 wherein the seat is formed of Nylon 66.

4. An air inlet bleed valve according to claim 1 wherein the closure element is a PTFE/acetal mixture.

5. An air inlet bleed valve according to claim 4 wherein the mixture comprises between 90 and 98% PTFE, balance acetal and inevitable impurities.

6. An air inlet bleed according to claim 5 wherein the PTFE component is substantially equal to 96%.

7. An air inlet bleed valve according to claim 1 which is adapted to open at an internal pressure of about 14 inches of Mercury or greater.

* * * * *